United States Patent [19]

Thomas

[11] 3,853,543

[45] Dec. 10, 1974

[54] PROCESS FOR PRODUCING ELEMENTAL COPPER BY REACTING MOLTEN CUPROUS CHLORIDE WITH ZINC

[76] Inventor: Harold K. Thomas, 3445 N. Valencia Ln., Phoenix, Ariz. 85018

[22] Filed: Jan. 4, 1974

[21] Appl. No.: 430,619

Related U.S. Application Data

[63] Continuation-in-part of Ser. No. 322,868, Jan. 11, 1973, abandoned.

[52] U.S. Cl............................. 75/72, 75/63, 75/86, 75/89, 75/104, 75/114
[51] Int. Cl............................................ C22b 15/00
[58] Field of Search............... 75/72, 74, 76, 63, 86, 75/88, 89, 104, 114

[56] References Cited
UNITED STATES PATENTS

| | | | |
|---|---|---|---|
| 1,736,659 | 11/1929 | Mitchell | 75/104 |
| 1,987,629 | 1/1935 | Miner | 75/72 |
| 2,776,881 | 1/1957 | Thomsen | 75/86 |
| 3,273,995 | 9/1966 | Ruppert et al. | 75/63 |
| 3,291,597 | 12/1966 | Mellgren | 75/63 |
| 3,607,233 | 9/1971 | Maczek | 75/86 |
| 3,630,721 | 12/1971 | McNulty | 75/72 |

OTHER PUBLICATIONS

Sachs, G. et al.; Practical Metallurgy; Cleveland (ASM) 1940 pp. 528–536.

*Primary Examiner*—Walter R. Satterfield
*Attorney, Agent, or Firm*—William H. Drummond

[57] ABSTRACT

A method is provided for processing copper-bearing materials such as copper scraps and copper concentrates to produce elemental copper. The copper-bearing materials are reacted with a ferric chloride leach reagent solution to convert the copper values therein to cuprous chloride. The pregnant leach liquor is a solution of cuprous chloride and the spent leach reagent, ferrous chloride. The leach liquor is evaporated to yield a solid residue of cuprous chloride and ferrous chloride. The ferrous chloride is separated from the cuprous chloride by washing with water to form a ferrous chloride solution. The spent leach reagent solution is oxidized, either chemically or catalytically, to form a regenerated leach reagent solution of ferric chloride which is recycled to the leaching step. The solid cuprous chloride is melted and reduced by reacting it with zinc at a temperature above the melting point of copper, 1,100°C., to produce vaporized zinc chloride and the molten elemental copper product. The zinc chloride vapors are separated from the copper product and reacted with elemental aluminum to yield molten zinc metal and vaporized aluminum chloride. The aluminum chloride vapors are separated from the elemental zinc and treated to recover the aluminum values either in the form of aluminum metal or alumina. The molten elemental zinc is recycled to the cuprous chloride reduction step.

2 Claims, 1 Drawing Figure

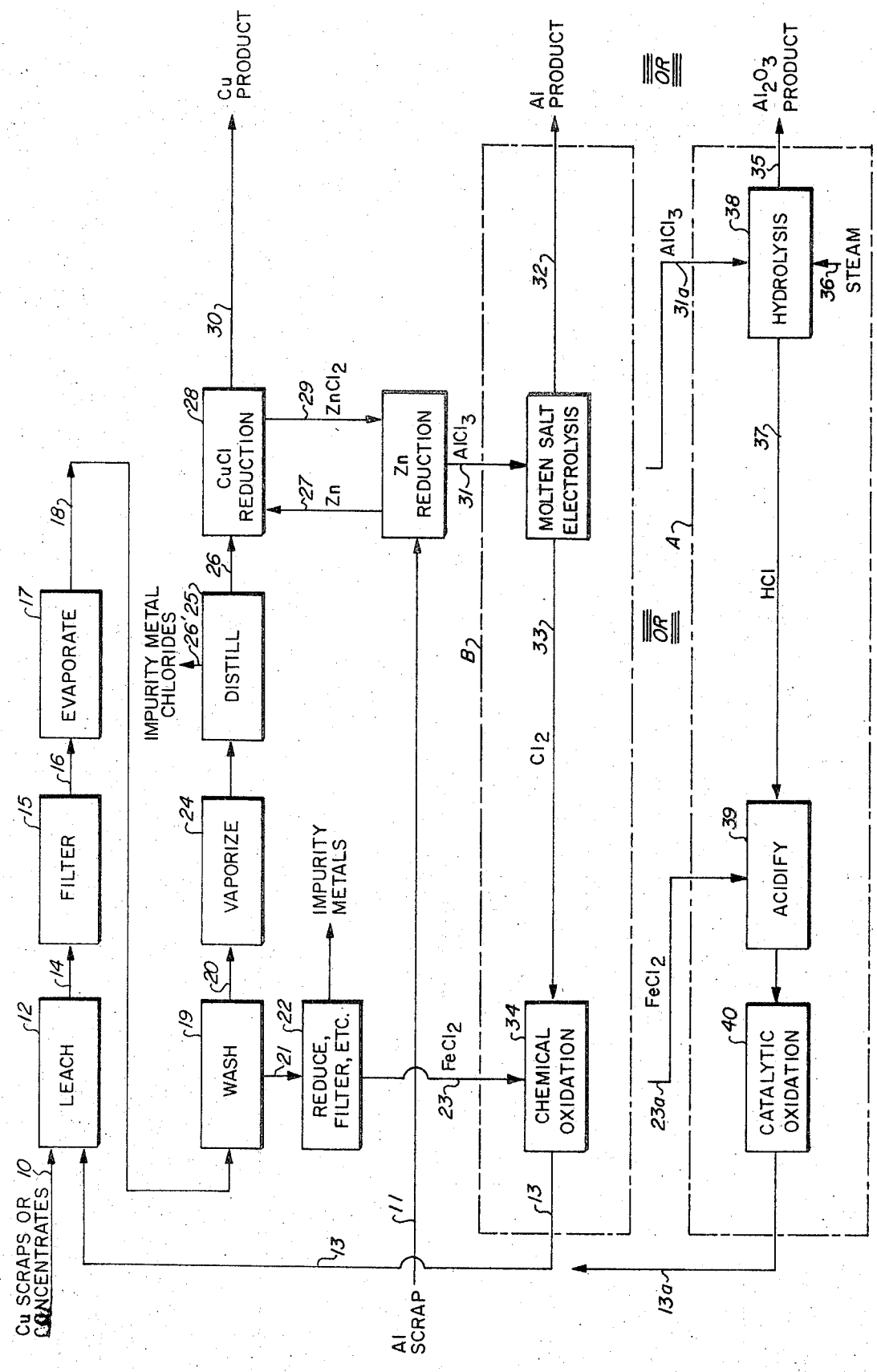

PROCESS FOR PRODUCING ELEMENTAL COPPER BY REACTING MOLTEN CUPROUS CHLORIDE WITH ZINC

This application is a continuation-in-part of my co-pending application for U.S. Letters Patent, Ser. No. 322,868, filed Jan. 11, 1973 and now abandoned, entitled "Process for Converting Cuprous Chloride to Elemental Copper."

This invention relates to a method for processing copper-bearing materials such as scraps and concentrates to produce elemental copper.

In a further and more specific respect, the invention concerns an integrated process for preparing copper and aluminum products from copper and aluminum scraps.

In a still further and more specific respect, the invention relates to a process for converting cuprous chloride to elemental copper.

More particularly, the invention relates to a cuprous chloride reduction process which is especially useful in combination with prior art processes for converting naturally occurring copper ores and copper scraps to cuprous chloride.

In still another respect, the invention relates to an overall process for production of elemental copper from naturally occurring sulfide ores and copper scraps which utilizes scrap aluminum and steam as the principal processing reagents and which produces, in addition to elemental copper, valuable sulfur and aluminum oxide or aluminum metal byproducts.

Considerable emphasis has recently been placed on the development of an economically feasible process for winning copper from its naturally occurring sulfide ores without employing conventional pryometallurgical smelting and converting techniques. This emphasis has arisen principally from the desire to avoid environmental pollution problems associated with the prior art reverberatory smelting and matte converting process.

According to one recently developed process, copper ore concentrates are leached at elevated temperatures in a ferric electro-dissolution cell employing a ferric chloride anolyte solution as the lixivalent. Such a process is disclosed, for example, in U.S. Pat. No. 3,673,061 to Paul R. Kruesi.

While such processes offer certain economic advantages, they also suffer the disadvantage of being dependent upon the availability of large quantities of inexpensive electrical power. It would therefore be highly advantageous to provide a process for converting cuprous chloride to elemental copper which has a comparatively much lower electrical power requirement while, at the same time, avoiding the corrosion problems of such processes and avoiding the employment of conventional pyrometallurgical smelting and converting steps and their concommitant environmental pollution problems.

Similarly, prior workers have not yet devised suitable processes for converting copper scraps which may be contaminated with other valuable or undesired metal impurities directly to an elemental copper product, the purity of which is suitable for direct commercial use. Rather, prior art copper scrap treating methods have generally been limited to merely adding the scrap to the copper converters in conventional pyrometallurgical copper smelting plants.

It is therefore the principal object of the invention to provide a process for economically and conveniently converting copper-bearing materials such as copper scraps and copper concentrates to elemental copper.

Another object of the invention is to provide a process for economically and conveniently converting cuprous chloride to elemental copper, which process is useful without regard to the source of the cuprous chloride.

Another object of the invention is to provide an overall process and a cuprous chloride reduction process useful therein which avoids conventional pyrometallurgical smelting steps.

Still another object of the invention is to provide a cuprous chloride reduction process which is conveniently and economically combinable with prior art techniques for conversion of naturally occurring copper sulfide ores and copper scraps to cuprous chloride to thus provide an overall integrated process for winning copper from its scraps and from its naturally occurring ores.

These and other objects and advantages of the invention will be apparent to those skilled in the art from the following detailed description thereof taken in conjunction with the drawing.

The drawing is a schematic representation of the presently preferred embodiment of the invention, showing an overall integrated process for the production of copper and aluminum metal or copper and alumina products from copper scraps and/or concentrates and aluminum scrap.

Briefly, in accordance with my invention, I provide a method for processing a copper-bearing material such as copper scrap or copper concentrate to produce elemental copper. In the presently preferred embodiment, I utilize scrap aluminum as the principal processing reagent, thus providing a convenient integrated process for converting scrap copper and aluminum materials to the respective pure metals or to pure copper metal and a valuable alumina product. In accordance with my process, the copper-bearing material is leached with a ferric chloride leach reagent solution to convert the copper values therein to cuprous chloride, yielding a pregnant leach liquor comprising a solution of cuprous chloride and spent-leach-reagent ferrous chloride. The cuprous chloride and ferrous chloride are separated from the pregnant leach liquor by evaporation, yielding a solid residue which is then washed with water to solubilize the ferrous chloride, and leaving a solid residue including the cuprous chloride. The spent leach reagent, ferrous chloride, is oxidized to form the regenerated leach reagent, ferric chloride, which is recycled to the leaching step.

The cuprous chloride residue from the washing step is melted, subjected to optional purification procedures, and is then reduced to molten elemental copper by reacting it with zinc while maintaining the temperature of the reaction mixture at above the melting point of elemental copper, about 1,100°C.

The zinc chloride vapors from the cuprous chloride reduction step are reacted with elemental aluminum to yield elemental zinc and vaporized aluminum chloride. The vaporized aluminum chloride is treated to recover either alumina or aluminum products therefrom, according to optional procedures disclosed below. The elemental zinc is recycled to the cuprous chloride reduction step.

In accordance with another feature of my invention, I have also discovered a method for converting cuprous chloride to elemental copper useful in this and other processes. This method comprises the steps of contacting molten cuprous chloride with molten zinc in a first reduction zone to reduce the cuprous chloride to molten elemental copper and to convert said molten zinc to zinc chloride fumes; withdrawing the zinc chloride fumes from the first reduction zone; cooling the zinc chloride fumes to form molten zinc chloride; contacting the molten zinc chloride in a second reduction zone with elemental aluminum to reduce the zinc chloride to molten elemental zinc and to convert the elemental aluminum to aluminum chloride vapors; withdrawing the molten elemental zinc from the second reduction zone and recycling it to the first reduction zone; withdrawing the aluminum chloride vapors from the second reduction zone; contacting the aluminum chloride vapors with steam to reduce the aluminum chloride to byproduct aluminum oxide; and withdrawing the product elemental copper from the first reduction zone.

The drawing illustrates an overall process for winning copper from its scraps and naturally occurring ore, incorporating the steps of the presently preferred embodiment of the present invention. It will be noted that two alternate methods of treating the aluminum chloride byproduct of the zinc reduction step and the spent leach reagent, ferrous chloride, are illustrated, as indicated by the dashed lines. Of these alternate methods, the technique employing molten salt electrolysis and chemical oxidation is preferred.

Copper scraps or copper concentrates produced according to conventional copper or milling techniques form the principal raw material feed stream 10, the principal reagent material being metallic aluminum 11, preferably in the form of aluminum scrap. The copper-bearing material 10 is leached 12 with an aqueous ferric chloride leach reagent solution 13 to convert the copper values in the feed stream 10 to a leaching mixture 14 containing dissolved cuprous chloride and spent leach reagent, ferrous chloride. The leaching mixture 14 is filtered 15 to separate the pregnant liquor 16 containing the dissolved cuprous chloride and ferrous chloride. The pregnant liquor 16 is evaporated 17 to dryness, yielding a solid residue 18 of a mixture of cuprous chloride and ferrous chloride. The solid residues are washed 19 with water to solubilize the ferrous chloride, leaving a solid residue 20 of cuprous chloride. The ferrous chloride solution 21 is then subjected to optional reduction and filtration procedures 22 to separate impurity metals as precipitates, leaving a substantially pure spent-leach-reagent solution 23 of ferrous chloride. The spent leach reagent 23 can be purified according to alternate procedures, as will be explained below.

The solid residue 20 of cuprous chloride from the washing step 19 is heated to evaporate 24 any wash water therefrom and is thereafter distilled 25 to separate any chlorides 26' of impurity metals which are insoluble and therefore are not removed in the washing step 19.

The purified cuprous chloride 26 is thereafter contacted with elemental zinc 27 in a reduction step 28 which converts the cuprous chloride 26 to molten elemental copper product 30, yielding a reaction byproduct of zinc-chloride 29. In accordance with the presently preferred embodiment of the invention, the cuprous chloride reduction step 28 is carried out by introducing the molten cuprous chloride into the top of a packed column and introducing the zinc 27, in the form of zinc vapors, at the bottom of the column. The rising zinc vapors 27 countercurrently contact the descending molten cuprous chloride 28 and the following reaction occurs:

$$2\ CuCl + Zn \longrightarrow ZnCl_2 + 2Cu \qquad (1)$$

The zinc chloride vapors exiting the top of the countercurrent contacting column are introduced into the bottom of another packed contacting column filled with aluminum scrap. The zinc chloride reacts with the aluminum scrap packing according to the following reaction:

$$3ZnCl_2 + 2Al \longrightarrow 3Zn + 2AlCl_3 \qquad (2)$$

The resulting zinc product is collected as a melt at the bottom of the column and recycled to the top of the cuprous chloride reduction tower.

The aluminum chloride formed as a vapor in the zinc reduction tower exits at the top as a byproduct stream 24 which is then treated to recover aluminum values according to the alternate procedures described below.

Alternate Aluminum Recovery and Reagent Regeneration Procedures

As shown in the drawing, the aluminum chloride stream 31 and ferrous chloride stream 23 can be treated according to alternate procedures to recover the aluminum values and regenerate the spent leach reagent.

Preferred Embodiment

According to the presently preferred embodiment of the invention, indicated by the dashed lines labeled B, the aluminum chloride vapors 31 are condensed by cooling and the solid aluminum chloride is subjected to molten salt electrolysis in the manner described in the document entitled, "Electrowinning Aluminum from Aluminum Chloride," Bureau of Mines Report of Investigations No. RI-7353, published March 1970 by the United States Department of the Interior. Briefly, in accordance with the molten salt electrolysis procedure, the aluminum chloride is melted with potassium chloride and sodium chloride to form a molten electrolyte which is electrolized at a temperature of 700°–760°C. in a rammed refractory, single-compartment, electrolytic cell, resulting in the evolution of chlorine gas, the molten aluminum product 32 being removed from the cell by siphoning or ladling. Additional aluminum chloride is added periodically to replenish that which is depleted from the electrolyte. The chlorine 33 evolved at the anode of the electrolytic cell is recycled to a chemical oxidation step 34 in which the aqueous solution of spent leach reagent, ferrous chloride 23, is oxidized to yield a regenerated leach reagent 13 comprising a solution of ferric chloride. The chemical oxidation of the ferrous chloride is conducted in accordance with the process disclosed at page 17 of the publication entitled, "Recovering Elemental Sulfur from Nonferrous Minerals," Bureau of Mines Report of Investigations No. RI-7474, dated January 1971, published by the United States Department of the Interior.

Briefly, in this technique, the chlorine is introduced above the surface of a stirred solution of ferrous chloride. The chlorine is absorbed by the stirred solution, converting all of the ferrous iron to ferric iron in an exothermic reaction which proceeds to stoichiometric completion.

Alternate Embodiment

If it is desired to convert the aluminum scrap 11 to alumina rather than to the elemental aluminum product 32 in accordance with the preferred embodiment disclosed above, one can proceed according to the alternate technique indicated by the dashed lines A in the drawing. In this alternate embodiment, the aluminum chloride stream 31a and ferrous chloride stream 23a are treated to yield a regenerated leach liquor stream 13a and an alumina ($Al_2O_3$) product 35. In this alternate embodiment, the aluminum chloride stream 31a is contacted at an elevated temperature with steam 36 and reacts according to the following equation:

$$2AlCl_3 + 3H_2O \rightarrow Al_2O_3 + 6HCl$$

(3)

The hydrochloric acid 37 produced in the steam hydrolysis step 38 is used to acidify 39 the ferrous chloride solution 23a which is then subjected to catalytic oxidation 40 in a process such as that disclosed in U.S. Pat. No. 3,542,508 to Sercombe, et al., issued Nov. 24, 1970. Briefly, in this technique, the ferrous chloride solution is contacted with oxygen on a platinum catalyst at or about ambient temperature. The regenerated leach reagent solution 13a is then recycled to the leaching step 12.

The following examples are presented to further illustrate the invention and the presently preferred embodiments thereof.

EXAMPLE 1

A chalcopyrite ore concentrate is ground to −200 mesh in a ball mill. The concentrate has the following analysis:

Table 1

|  | Wt. Percent |
|---|---|
| Copper | 27.1 |
| Sulphur | 32.1 |
| Iron | 27.5 |
| Zinc | 0.265 |
| Molybdenum | 0.221 |
| Lead | 0.074 |
| Antimony | 0.047 |
| Arsenic | 0.033 |
| Bismuth | 0.022 |
| Selenium | 0.009 |
| Insol. | 12.24 |

The ground concentrate is slurried in a stirred reactor with a ferric chloride solution containing 50 percent by weight $FeCl_3$. The slurry is acidified with hydrochloric acid to $pH_2$. Agitation of the slurry is continued for 30 minutes, after which the slurry is thickened and filtered to separate the undissolved solids from the pregnant liquor.

The filter cake is dried at 200°F in a rotary kiln to drive off water vapors. The dried solids are then transferred to an enclosed reverberatory furnace and heated to a temperature of 500°C for approximately 30 minutes to vaporize the free sulfur from the filter cake. The sulfur fumes are condensed in a water spray tower, yielding a suspension of free sulfur which is filtered to recover a commercially pure sulfur product.

The solid residue from the sulfur vaporization step is diluted with water to 25 percent solids and conditioned with a promotor (AC 238). The pH of the conditioned slurry is adjusted with lime to pH 9.5 and the mixture is then floated to produce an unreacted concentrate product. The flotation concentrate is recycled and combined with the concentrate fed to the $FeCl_3$ leaching step.

The pregnant liquor from the $FeCl_3$ leaching step is evaporated to dryness to drive off free HCl. The dry residue from the pregnant liquor evaporation step is then leached with water to separate soluble impurity metal chlorides from the relatively insoluble cuprous chloride. The soluble metal chloride solution consists primarily of ferrous chloride ($FeCl_2$) with trace quantities of the other impurity metal chlorides. This solution is acidified with HCl to pH 2 and agitated with iron powder to reduce the chlorides of bismuth and residual elemental copper. These reduced residues are then removed by filtration. The zinc chloride in the solution is separated by solvent extraction at pH 1.5 with a solution of 7.5 wt. percent tertiarybutylamine dissolved in kerosene. If desired, the zinc values are recovered from the extraction solvent by stripping with sodium carbonate, yielding a zinc hydroxide byproduct.

The stripped ferrous chloride solution is subjected to electrolysis in an Electrowin iron cell, yielding an electroplated iron powder byproduct and the ferric chloride solution is recycled to the concentrate leaching step.

The washed cuprous chloride is dried and heated to a temperature of 1,100°C for one hour to vaporize any remaining traces of impurity metal chlorides. The resulting molten cuprous chloride intermediate is continuously fed into an enclosed refractory-lined furnace already containing molten copper. Molten zinc is then introduced into the furnace at a controlled rate to prevent excessive temperature rise from the exothermic reaction between the zinc and the cuprous chloride. The zinc metal (boiling point 907°C) distills at the temperature of the molten copper (1,100°C) and fumes up through the cuprous chloride, instantly reacting to produce copper metal and zinc chloride vapors. The zinc chloride fumes are condensed outside the furnace and collected as molten zinc chloride. Any entrained cuprous chloride in the zinc chloride vapors is refluxed back into the furnace. The copper metal thus produced sinks into the lower molten copper layer and is subsequently withdrawn as commercially pure copper suitable for use in casting wirebars, etc.

It should be noted that the copper product is comparable in purity to commercial cathode copper because it is produced from a substantially pure CuCl intermediate which is reduced by substantially pure zinc in an enclosed oxygen-free environment in the reduction furnace.

The molten zinc chloride is introduced into a second enclosed refractory-lined furnace containing aluminum metal chips of sizes convenient for handling. The molten zinc chloride is fed into this second furnace at a rate to control the temperature of the exothermic reaction mixture at approximately 600°C. The zinc chloride is reduced to free zinc with the production of aluminum chloride ($AlCl_3$) vapors. The aluminum chloride vapors are withdrawn from the furnace for subsequent treatment. The molten zinc metal is withdrawn from the furnace and distilled to produce substantially pure zinc metal which is recycled to the cuprous chloride reduction furnace.

The aluminum chloride vapors from the zinc chloride reduction furnace are introduced into a chamber and mixed with steam to convert the aluminum chloride to aluminum oxide ($Al_2O_3$) and HCl vapors. The aluminum oxide is collected in the bottom of the chamber as substantially pure $Al_2O_3$ ready for commercial use. The HCl vapors are drawn off and collected in a wash tower.

The resultant copper product analyzes 99.9+% Cu.

EXAMPLE 2

The general procedures of Example 1 are repeated with the following exceptions. The concentrate of Example 1 is replaced by a raw material feed consisting of a copper-bearing scrap, such as yellow brass, having the following analysis:

Table 2

|  | Wt. % |
|---|---|
| Copper | 50 |
| Zinc | 50 |

The copper scrap is in the form of turnings and cuttings. After leaching, there is no significant solid residue.

The pregnant liquor is treated as in Example 1, except that the stripped ferrous chloride solution is chemically oxidized in accordance with procedure B of the drawing and, in accordance therewith, the aluminum chloride from the zinc reduction step is subjected to molten salt electrolysis to produce an aluminum metal product and byproduct chlorine which is recycled to the chemical oxidation step.

Finally, instead of reducing the zinc chloride in the enclosed refractory-lined furnace of Example 1, it is reduced by countercurrent contact with aluminum in a column and the molten zinc obtained is distilled and the purified zinc vapors are fed to the bottom of another packed reduction column and countercurrently contacted with the molten cuprous chloride. The molten metallic copper product is withdrawn from the bottom of this column and the zinc chloride vapors are recycled to the zinc reduction column.

The resulting copper product analyzes at 99.9+% Cu and the resulting aluminum product is of a purity equal to or better than 1,100 series metal.

I claim:

1. A method for processing a copper-bearing material, such as copper scraps and copper concentrates, to produce elemental copper, said process comprising:
   a. reacting said copper-bearing material with a ferric chloride leach reagent solution to convert the copper values therein to cuprous chloride, yielding a pregnant leach liquor comprising a solution of said cuprous chloride and spent-leach-reagent ferrous chloride;
   b. separating said cuprous chloride and ferrous chloride from said pregnant leach liquor by evaporation thereof, yielding a solid residue comprising said curpous chloride and said ferrous chloride;
   c. separating said ferrous chloride from said solid residue by washing with water to solubilize said ferrous chloride, leaving a solid residue comprising said cuprous chloride;
   d. regenerating said spent-leach-reagent ferrous chloride by oxidation thereof to form regenerated-leach-reagent ferric chloride;
   e. recycling said regenerated-leach-reagent ferric chloride to the leaching step of step (a);
   f. melting said solid cuprous chloride;
   g. reducing the molten cuprous chloride of step (f) by reacting it with zinc while maintaining the temperature of the reaction mixture above about 1,100°C. to produce vaporized zinc chloride and molten elemental copper;
   h. separating said zinc chloride vapors from said molten elemental copper product;
   i. reacting said zinc chloride with elemental aluminium to yield elemental zinc and a vaporized aluminum chloride reaction product;
   j. separating said vaporized aluminum chloride from said elemental zinc;
   k. recycling said elemental zinc to the cuprous chloride reduction step of step (g); and
   l. treating the aluminium chloride reaction product of step (i) to recover an aluminum product therefrom.

2. A method for converting cuprous chloride to elemental copper, comprising:
   a. contacting molten cuprous chloride with zinc in a first reduction zone to reduce said cuprous chloride to molten elemental copper and to convert said zinc to zinc chloride fumes;
   b. withdrawing said zinc chloride fumes from said first reduction zone;
   c. contacting said zinc chloride in a second reduction zone with elemental aluminum to reduce said zinc chloride to molten elemental zinc and to convert said elemental aluminum to aluminum chloride vapors;
   d. withdrawing said elemental zinc from said second reduction zone and recycling it to said first reduction zone;
   e. withdrawing said aluminum chloride vapors from said second reduction zone;
   f. treating said aluminum chloride to recover aluminum values therein; and
   g. withdrawing product elemental copper from said first reduction zone.

* * * * *